United States Patent Office 3,157,511
Patented Nov. 17, 1964

3,157,511
ANIMAL FEEDS
Jonas Kamlet, New York, N.Y., assignor to Celanese Corporation of America, New York, N.Y., a corporation of Delaware
No Drawing. Filed July 1, 1960, Ser. No. 40,176
15 Claims. (Cl. 99—4)

This invention relates to improved feeding stuffs for animals, such as swine and poultry such as chickens, geese, turkeys and pheasants. The purpose of this invention is to provide the animal raiser with a means for assuring the maximum growth of his stock and the optimum efficiency of feed utilization.

In recent years, several non-nutritional substances have been found to possess the property of stimulating the rate of growth of animals, and of improving the efficiency with which rations are utilized by the feeding stock. The best known of these are such antibiotics as aureomycin, zinc bacitracin, procaine penicillin, etc. In addition, other non-nutritional substances, principally surface-active agents, have also been found to stimulate growth of animals and feed utilization (U.S. Patent 2,619,420 (1952); U.S. Patent 2,809,892 (1957); U.S. Patent 2,844,466 (1958); U.S. Patent 2,739,063 (1956); U.S. Patent 2,753,266 (1956); Lillie, Sizemore and Denton, Poultry Science 37, #2, 288–292; Stokstad, Food Technology 9, #8, 405–408 (1955)).

It is therefore the general object of this invention to provide animal feeds containing novel and useful growth-promoting substances which are essentially non-nutritional in nature, which compare favorably with presently-used antibiotics as to cost and results obtained, and which improve the efficiency with which the animals utilize and convert the feeding stuffs. Further objects and advantages of this invention will become obvious in the course of our description thereof in this specification.

One aspect of my invention is the finding that the addition of beta-nitropropionic acid, or a salt thereof, in minor amounts, to a poultry feed, greatly increases the efficiency with which this feed is utilized by the poultry and greatly increases the rate of growth of the poultry. It has also been found that the addition of beta-nitropropionic acid or a salt thereof, in minor amounts and in conjunction with an antibiotic (such as zinc bacitracin, procaine penicillin, aureomycin, etc.), greatly increases the efficiency of feed utilization and the rate of growth of the poultry, in excess of the increases noted by the addition of the said antibiotics alone to said feed.

Beta-nitropropionic acid forms crystals, melting at 66°–67° C., soluble in water, alcohol, ether and in warm chloroform, is poorly soluble in cold chloroform, in petroleum ether and in other hydrocarbon solvents. This compound may be made by the reaction of beta-iodo-propionic acid with silver nitrate (Lewkowitsch, Journ. Prakt. Chem. (2), 20, 169 (1879), or by the vapor-phase nitration of propionic acid (Hass and Hidgin, Journ. Amer. Chem. Soc. 76, 2692–4 (1954). However, it is most conveniently prepared by the reaction of sodium nitrite with beta-propiolactone, followed by the acidification of the resultant salt of beta-nitropropionic acid (Hass, Feuer and Pier, Journ. Amer. Chem. Soc. 73, 1858 (1951); Gresham, Jansen and co-workers (Journ. Amer. Chem. Soc. 74, 1323–5 (1952).

I have found that the alkali metal- and alkali earth-metal salts of beta-nitropropionic acid, made by the direct reaction of beta-propiolactone to aqueous solutions of the corresponding alkali metal nitrites (e.g. sodium nitrite, potassium nitrite) or alkaline earth metal nitrites (e.g. calcium nitrite), without acidification to liberate the free acid, may be used as complete equivalents of beta-nitropropionic acid in the poultry feeds of this invention. The reactions involved are:

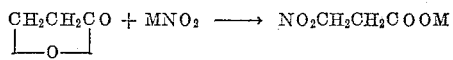

(M representing an equivalent of an alkali-metal or an alkaline earth metal).

Beta-nitropropionic acid has also been identified as a fermentation product produced by *Aspergillus oryzae* (Chiyiro Shimoda and Yeshinobia Nishiwaka, Journ. Agricultural Chemical Society of Japan 25, #5, 254–261 (1951); 26, #12, 645–647 (1952); 26, #12, 648–650 (1952); 28, #12, 909–913 (1954), and 28, #10, 832–837 (1954), as a metabolic product of *Aspergillus flavus* (Bush et al.; Journ. Biol. Chem. 188, 685 (1951), and as a component of *Indigofera endecaphylla* (Morris, Pagan and Warmke, Science, March 5, 1954, 119, #3088, 322–323).

The mode of action of beta-nitropropionic acid is believed to be that of an anti-metabolite or an anti-vitamin, antagonistic to beta-alanine, which is a basic component of pantothenic acid. This is an essential metabolic requirement of all microorganisms. It is believed that this anti-metabolite or anti-vitamin activity of beta-nitropropionic acid inhibits the growth of undesirable organisms in the digestive tract of the poultry, and thus permits a greater rate of growth and better feed utilization. However, this explanation is subject to further experimental confirmation. It is by no means intended to limit this invention in any manner to this explanation, or to any other explanation of the mode of action of the beta-nitropropionic acid in the poultry feeds of this invention.

EXAMPLE I

To illustrate the growth-stimulating effects and the increase in feed utilization obtained with the use of beta-nitropropionic acid in poultry feeds, day-old chicks were fed on the following basal diet:

| | Grams |
|---|---|
| Yellow corn | 49 |
| Corn gluten meal | 5 |
| Distillers' solubles | 4 |
| Alfalfa meal | 2 |
| Soybean meal | 28 |
| Calcium carbonate | 1.5 |
| Bone meal | 2.5 |
| Iodized salt | 0.25 |
| Manganese sulfate | 0.025 |
| Vitamins A and D oils | 1.0 |
| Choline chloride | 0.05 |
| Mixed vitamins | 0.10 |

Duplicate pens of 12 New Hampshire chicks per pen were fed on this diet for 28 days. Beta-nitropropionic acid and other antibiotics, as well as beta-nitropropionic acid in conjunction with other antibiotics, were fed to similar duplicate pens of 12 New Hampshire chicks per pen for 28 days. The following results were obtained.

Supplement: Fed to
Control (none) _____ Pen A
5 gms. beta-nitropropionic acid/ton _____ Pen B
10 gms. beta-nitropropionic acid/ton _____ Pen C
20 gms. beta-nitropropionic acid/ton _____ Pen D
50 gms. beta-nitropropionic acid/ton _____ Pen E
10 gms. procaine-penicillin/ton _____ Pen F
10 gms. procaine-penicillin plus 20 gms. beta-nitropropionic acid/ton _____ Pen G
10 gms. zinc bacitracin/ton _____ Pen H
10 gms. zinc bacitracin plus 20 gms. beta-nitropropionic acid/ton _____ Pen I
10 gms. aureomycin/ton _____ Pen J
10 gms. aureomycin plus 20 gms. beta-nitropropionic acid/ton _____ Pen K The average weight and feed conversions per pen were as follows:

AVERAGE WEIGHT

|  | First Rep. | Second Rep. | Average Rep. | Percent Response |
|---|---|---|---|---|
| Pen A | 248.4 | 251.4 | 249.9 | |
| Pen B | 261.2 | 269.4 | 265.3 | 6.2 |
| Pen C | 287.0 | 279.6 | 283.3 | 13.4 |
| Pen D | 299.8 | 307.7 | 303.9 | 21.6 |
| Pen E | 301.7 | 296.4 | 303.6 | 21.5 |
| Pen F | 288.6 | 279.4 | 384.0 | 13.6 |
| Pen G | 312.6 | 310.8 | 311.7 | 24.7 |
| Pen H | 281.6 | 290.6 | 286.1 | 14.5 |
| Pen I | 301.6 | 304.4 | 303.0 | 21.2 |
| Pen J | 274.4 | 279.6 | 277.0 | 10.8 |
| Pen K | 310.4 | 312.8 | 311.6 | 24.7 |

FEED CONVERSION

|  | First Rep. | Second Rep. | Average Rep. | Percent Response |
|---|---|---|---|---|
| Pen A | 2.70 | 2.84 | 2.77 | |
| Pen B | 2.62 | 2.58 | 2.60 | 6.1 |
| Pen C | 2.51 | 2.48 | 2.50 | 9.7 |
| Pen D | 2.49 | 2.50 | 2.50 | 9.7 |
| Pen E | 2.46 | 2.50 | 2.48 | 10.5 |
| Pen F | 2.61 | 2.58 | 2.60 | 6.1 |
| Pen G | 2.40 | 2.38 | 2.39 | 13.7 |
| Pen H | 2.58 | 2.49 | 2.54 | 8.3 |
| Pen I | 2.47 | 2.40 | 2.44 | 11.9 |
| Pen J | 2.61 | 2.51 | 2.56 | 7.6 |
| Pen K | 2.44 | 2.39 | 2.42 | 12.6 |

It will thus be noted that:

(a) The addition of from 5 to 50 grams of beta-nitropropionic acid per ton of feed, produces a 6.2% to 21.6% increase in weight over that obtained without such additions to the basal ration;

(b) The addition of beta-nitropropionic acid to poultry feeds containing antibiotics considerably enhances the weight increases obtained. Thus, adding 10 grams (per ton of feed) of procaine-penicillin, of zinc bacitracin and of aureomycin produces weight increases of from 10.8% to 14.5%. The addition of 10 grams of antibiotic and 20 gms. of beta-nitropropionic acid (per ton of feed) produces weight increases of 21.2% to 24.7%.

(c) Beta-nitropropionic acid alone, added in amounts of from 5 to 50 grams per ton of feed, improves feed conversion from 6.1% to 10.5%. Beta-nitropropionic acid (20 gms. per ton of feed) and 10 gms. of various antibiotics (10 gms. per ton of feed) improve feed conversion from 6.1% to 13.7%. The beta-nitropropionic acid may thus be said to possess an antibiotic-extending or antibiotic-sparing function in poultry feeds, or may be considered as having a synergistic activity in promoting said activity.

EXAMPLE II

One mole (72 gms.) of beta-propiolactone is added in course of one hour to a solution of one mole (70 gms.) of sodium nitrite in 400 cc. of water. The reaction mixture was agitated and maintained at 15°–20° C. by cooling during this addition. After an additional hour of standing at room temperature, the reaction mixture was evaporated at 25°–30° C., under reduced pressure, to a dry solid mass containing sodium beta-nitropropionate and sodium nitrite. By analysis, this product assayed about 62% sodium beta-nitropropionate by weight.

In a similar manner, a dry product containing 48% calcium beta-nitropropionate was made from beta-propiolactone and calcium nitrite.

Duplicate pens of 12 New Hampshire chicks per pen were fed with the basal diet described in Example I for 28 days, with the addition of various amounts of the sodium beta-nitropropionate and the calcium beta-nitropropionate. The results obtained were as follows.

Supplement: Fed to
Control (none) _____ Pen A
20 gms. beta-nitropropionic acid/ton _____ Pen D
20 gms. beta-nitropropionic acid as the sodium salt/ton _____ Pen L
20 gms. beta-nitropropionic acid as the calcium salt/ton _____ Pen M

AVERAGE WEIGHT

|  | First Rep. | Second Rep. | Average Rep. | Percent Response |
|---|---|---|---|---|
| Pen A | 248.4 | 251.4 | 249.9 | |
| Pen D | 299.8 | 307.7 | 303.9 | 21.6 |
| Pen L | 289.6 | 291.2 | 290.4 | 16.2 |
| Pen M | 291.8 | 293.4 | 292.6 | 17.1 |

FEED CONVERSION

|  | First Rep. | Second Rep. | Average Rep. | Percent Response |
|---|---|---|---|---|
| Pen A | 2.70 | 2.84 | 2.77 | |
| Pen D | 2.49 | 2.50 | 2.50 | 9.7 |
| Pen L | 2.42 | 2.39 | 2.41 | 13.0 |
| Pen M | 2.44 | 2.40 | 2.42 | 12.6 |

It will thus be noted that the alkali metal salts and the alkaline earth metal salts of the beta-nitropropionic acid are as effective as the free acid for improving the feed utilization and increasing the weight of poultry fed with a basal diet containing the same.

In preparing the poultry feeds of this invention, the beta-nitropropionic acid or an alkali metal or alkaline-earth metal salt thereof, may be added directly to the feed, in a solid form or in solution. Alternately, these substances may be intimately mixed with another feed ingredient, such as one of the commonly used feed ingredients like bone meal, calcium carbonate, etc., to produce a premix, e.g. a 5% to 10% premix in bone meal. An appropriate amount of this premix is then distributed throughout the entire feed in a feed mixer.

In the instant specification, this invention has been described in conjunction with and in relation to certain specific embodiments thereof, and some details and examples and have been set forth for purpose of illustration. However, these examples are given solely to define and to illustrate this invention, but in no way to limit it to reagents, proportions or conditions described therein. Other modifications and improvements may occur to any person skilled in the art, and many of the specific details can be varied widely without departing from the basic concepts of this invention. Thus, many other different types of antibiotics and non-nutritional additives may be incorporated in the poultry feeding stuffs. Although the examples given above refer to the feeding of chicks only, similar results are obtained in the feeding of mature hens and cocks, turkeys, geese, pheasants and other species of poultry. Any addition of beta-nitropropionic acid and salts thereof to feeding stuffs of any nature whatever, alone or in conjunction with antibiotics and other non-nutritional additives, in the feeding of poultry is envisaged as within the basic concept of this invention.

While this invention has been disclosed particularly for the feeding of poultry, it may also be used for the feeding of other domestic animals, especially for non-ruminants such as swine. Although for this purpose I may use the same rations as described above as poultry feeds, with the same proportions of the beta-nitropropionic acid or its salt, it is more desirable to choose rations more specifically adapted for feedings pigs. The following basal rations, in which all percentages are by weight, are particularly suitable for feeding baby pigs, which have been weaned from the sow at 6–10 days of age.

Ration A

| | Percent |
|---|---|
| Purified soybean protein (Drackett C-1 assay protein, 83.1% crude protein) | 29.70 |
| DL-methionine | 0.10 |
| Corn starch | 10.00 |
| Sucrose (cane sugar) | 12.10 |
| Dicalcium phosphate | 3.95 |
| Calcium carbonate (precipitated chalk) | 0.66 |
| Trace minerals (CCC 35–D–10)[1] | 1.63 |
| Salt (iodized) | 0.50 |
| Vitamin mix [2] | 0.40 |
| Lard (stabilized) | 2.50 |
| Comminuted dried beet pulp | 2.00 |
| Dextrose | 36.46 |

[1] The CCC 35–D–10 trace minerals mixture contains $MnSO_4 \cdot 7H_2O$, 2.453%; $FeSO_4 \cdot 7H_2O$, 11.068%; $CuCO_3$, 0.085%; $CoSO_4$, 0.059%; $ZnSO_4$, 0.553%; $MgSO_4$, 30.437%; $MgCO_3$, 0.922%; $K_2SO_4$, 54.418%; KI, 0.05%.

[2] The vitamin mix is added at the rate (per pound of diet) of: vitamin A, 5000 I.U., vitamin $D_2$, 1000 I.U.; riboflavin, 5 mgms.; pantothenic acid, 10 mgms.; niacin, 30 mgms.; choline chloride, 450 mgms.; vitamin $B_{12}$, 20 micrograms; folic acid, 9 micrograms; thiamin, 5 mgms.; pyridoxine, 2 mgms.; p-aminobenzoic acid, 8 mgms.; biotin, 20 micrograms; inositol, 250 mgms.; alpha-tocopherol, 10 mgms.; menadione, 3 mgms.; ascorbic acid, 300 mgms.

Ration B

| | Percent |
|---|---|
| Ground yellow corn | 78.5 |
| Soybean oil meal cake (solvent extracted) | 15.4 |
| Meat and bone scraps | 2.5 |
| Calcium carbonate (precipitated chalk) | 0.6 |
| Steamed bone meal | 1.4 |
| Iodized salt | 0.5 |
| Trace minerals mixture | 0.1 |
| Vitamin pre-mix added per lb. of feed: | |
|     Riboflavin _____mgm__ | 1.0 |
|     d-Calcium pantothenate ____mgms__ | 2.0 |
|     Choline chloride _____mgms__ | 50.0 |
|     Niacin _____mgms__ | 8.0 |
|     Vitamin $D_2$ _____I.U__ | 400 |

To the above basal rations the beta-nitropropionic acid (which may, if desired, be in the form of a salt, such as the sodium or calcium salt) is added in proportions of, for example 5 to 100 grams per ton (e.g. 5, 10, 25, 50, 75 or 100 grams per ton). It is most convenient to add the beta-nitropropionic acid, or its salt, in the form of a concentrate or premix. For this purpose the premixes in bone meal or calcium carbonate described previously may be employed. Other suitable premixes contain about 5 to 50% of the beta-nitropropionic acid, or its salt, or a mixture of acid and salt, in any of the following: sodium chloride, wheat bran, wheat flour, dried milk powder, potato starch, or mixtures thereof; It will be understood that the same premixes may also be employed in poultry feed. As in the case of poultry feed, an antibiotic, such as zinc bacitracin, procaine penicillin, aureomycin or the like, may be incorporated in the feed. This antibiotic may be added to the premix, e.g. in a weight of about half the weight of nitropropionic acid, or less.

EXAMPLE III

Tests were conducted on five lots of six pigs per lot for 112 days (16 weeks). The feed in all cases was Ration B, described above, except that for four of the lots the feed also contained a small amount of beta-nitropropionic acid. The following results were obtained:

| Lot No. | Grams of beta-nitropropionic acid added per ton of feed | Average Initial Weight (lbs.) | Average Final Weight (lbs.) | Average Daily Gain (lbs.) | Average Feed Consumed (lbs.) | Average Feed (lbs.) per lb. gain |
|---|---|---|---|---|---|---|
| 1 | 0 | 25.8 | 170.5 | 1.29 | 492 | 3.40 |
| 2 | 5 | 25.6 | 175.0 | 1.33 | 488 | 3.27 |
| 3 | 10 | 26.1 | 190.0 | 1.43 | 480 | 2.99 |
| 4 | 25 | 26.0 | 204.0 | 1.59 | 611 | 3.00 |
| 5 | 50 | 25.7 | 200.5 | 1.56 | 614 | 3.06 |

This application is a continuation in part of my copending applications Serial No. 795,906, filed February 27, 1959, and Serial No. 2,102, filed January 13, 1960, both now abandoned.

It is to be understood that the foregoing detailed description is given merely by way of illustration and that many variations may be made therein without departing from the spirit of my invention.

Having described my invention what I desire to secure by Letters Patent is:

1. Animal feeds containing a growth-promoting amount, in the proportion of from 5 to 100 grams per ton, of a member of the group consisting of beta-nitropropionic acid, the alkali metal and alkaline earth metal salts thereof.

2. Poultry feeds containing a growth-promoting amount from 5 to 50 grams per ton of a member of the group consisting of beta-nitropropionic acid, the alkali metal salts thereof and the alkaline earth metal salts thereof.

3. The animal feeds of claim 1 containing minor amounts of an antibiotic.

4. The animal feeds of claim 1 containing minor amounts of procaine penicillin.

5. The animal feeds of claim 1 containing minor amounts of zinc bacitracin.

6. The animal feeds of claim 1 containing minor amounts of aureomycin.

7. Poultry feeds containing a growth-promoting amount from 5 to 50 grams per ton of a member of the group consisting of beta-nitropropionic acid, the alkali metal and the alkaline earth metal salts thereof, and from 5 to 50 grams per ton of an antibiotic from the group consisting of procaine penicillin, zinc bacitracin and aureomycin.

8. A feed supplement for use in making feedstuffs for poultry and swine and which contains from about 5% to about 50%, by weight, of beta-nitropropionic acid and the remainder a solid diluent or carrier therefor, suitable for incorporation into feedstuffs for poultry and swine to obtain finished feedstuffs for said animals containing a growth-promoting amount of beta-nitropropionic acid in the proportion of from 5 to 100 grams per ton.

9. A nutritionally balanced animal feed containing a growth-promoting amount, in the proportion of from 5 to 100 grams per ton, of a member of the group consisting of beta-nitropropionic acid and the alkali metal and alkaline earth metal salts thereof.

10. Pig feeds containing a growth-promoting amount, in the proportion of from 5 to 100 grams per ton, of a member of the group consisting of beta-nitropropionic acid, the alkali metal and alkaline earth metal salts thereof.

11. Pig feeds containing a growth-promoting amount, in the proportion of from 5 to 100 grams per ton, of beta-nitropropionic acid.

12. Pig feeds as set forth in claim 11 containing minor amounts of an antibiotic.

13. Poultry feeds containing a growth-promoting amount of beta-nitropropionic acid in the proportion of from 5 to 50 grams per ton.

14. Poultry feeds containing a growth-promoting amount of sodium beta-nitropropionate in the proportion of from 5 to 50 grams per ton.

15. Poultry feeds containing a growth-promoting amount of calcium beta-nitropropionate in the proportion of from 5 to 50 grams per ton.

References Cited in the file of this patent

FOREIGN PATENTS 752,552   Great Britain _____ July 11, 1956

OTHER REFERENCES

Hutton et al.: J. Nutrition 64 (March 10, 1958), pp. 321–337.

Bush et al.: Jr. Biol. Chem., 1951, pp. 685–693.